United States Patent Office 3,300,480
Patented Jan. 24, 1967

3,300,480
CERTAIN ADAMANTANE AZIRIDIDES
Venkatachala L. Narayanan, North Brunswick, N.J., assignor to E. R. Squibb & Sons, Inc., New York, N.Y., a corporation of Delaware
No Drawing. Filed July 26, 1966, Ser. No. 567,845
8 Claims. (Cl. 260—239)

This application is a continuation-in-part of application Serial No. 489,053, filed September 21, 1965.

This invention relates to a process for the production of adamantaldehydes. More particularly, the invention relates to an improved process for the production of 1-adamantaldehydes in high yields from 1-adamantanecarboxylic acids.

The process of this invention may be applied to the production of 1-adamantaldehyde as well as 1-adamantaldehydes variously substituted on the ring. Of especial interest are 1-adamantaldehydes of the formula

I)

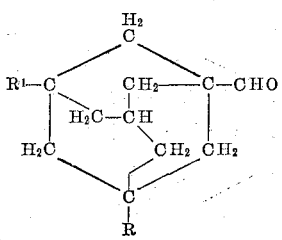

wherein R and $R^1$ each represents hydrogen, halo, lower alkyl, phenyl, R-phenyl, hydroxy and lower alkoxy.

Other substituents, however, are also within the scope of this invention.

In Formula I the lower alkyl groups and lower alkoxy groups include straight and branched chain groups such as methyl, ethyl, propyl, isopropyl, amyl, methoxy, ethoxy, propoxy, isopropoxy and the like. All four halogens are included but chlorine and bromine are preferred.

The improved process of deriving 1-adamantaldehydes from 1-adamantanecarboxylic acids comprises converting the 1-adamantanecarboxylic acid to the 1-adamantanecarboxylic acid halide with a halogenating agent, e.g., with thionyl chloride, phosphorous pentachloride, oxalyl chloride or the like. The acid chloride is then converted to the 1-adamantyl aziridinyl ketone by reacting with an aziridine such as ethyleneimine or a substituted aziridine, e.g., a lower alkyl aziridine like 2-butylaziridine or di-lower alkyl aziridne like 2,2-dibutylaziridine, and the aziridinyl ketone is then reduced, e.g., with lithium aluminum hydride, lithium borohydride, diisobutyl aluminum hydride or the like to yield the desired aldehyde.

The following flow diagram, as applied to the preferred compounds and reactants, is illustrative:

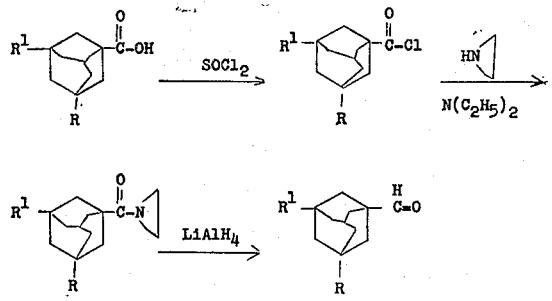

The first step of converting the 1-adamantanecarboxylic acid to the acid chloride may be effected by adding the halogenating agent directly to the former or, if desired, utilizing an inert organic solvent such as benzene, chloroform, dioxane, hexane or the like. The halogenation reaction may be carried out at a temperature from about 40 to 80° C., preferably about 60° C.

The acyl halide may be isolated, e.g., by evaporating off the excess halogenating agent and solvent in vacuo, and recrystallizing the residue from a mixture of chloroform and ether, or converted directly to the aziridinyl ketone without purification. In either case, the acyl halide is preferably added slowly to the ethyleneimine which is dissolved in an anhydrous organic solvent such as ether, chloroform, tetrahydrofuran or the like together with an excess of organic base which acts as hydrogen halide acceptor, e.g., alkylamine, such as triethylamine, pyridine or a heterocyclic such as piperidine, morpholine or the like. The reaction is carried out preferably at a low temperature, e.g., about 0 to 10° C. The organic base-hydrohalide salt generally precipitates so that the adamantyl aziridinyl ketone may be readily separated.

The ketone is then reduced with lithium aluminum hydride, lithium borohydride, diisobutylaluminum hydride, or the like, preferably at a low temperature, e.g., about −5 to 10° C., in an inert organic solvent such as ether, dimethoxyethane, tetrahydrofuran, dioxane or the like, and the product is isolated, e.g., by evaporation of the solvent, isolation as the semicarbazone and subsequent acid hydrolysis, isolation as the oxime and exchange with pyruvic acid, or similar method.

The 1-adamantanecarboxaldehyde is thus readily obtained in very good yield. These products are useful as intermediates for the synthesis of other organic compounds, e.g., adamantyl hydrazides and especially basically substituted adamantyl-2,3-dihydro-1,5-benzothiazepinone central depressants, e.g., 2-(1-adamantyl)-2,3-dihydro-5-(2-dimethylaminoethyl) - 1,5 - benzothiazepin-4-one. Such products may be obtained from the adamantaldehyde by reacting the aldehyde with an acid like malonic acid to produce 3-(1-adamantyl)acrylic acid, reacting the latter with a 2-aminobenzenethiol which converts it to the adamantyl-dihydrobenzothiazepinone, which is subsequently reacted with sodamide and an aminoalkyl halide such as dimethylaminoethyl bromide to obtain the end product.

Suitable acid starting materials include, for example, 1-adamantanecarboxylic acid, 3-methyl-1-adamantanecarboxylic acid, 3-phenyl-1-adamantanecarobxylic acid, 3-hydroxy - 1 - adamantanecarboxylic acid, 3-methoxy-1-adamantanecarboxylic acid, 3-fluoro-, 3-chloro-, 3-bromo- and 3-iodo-1-adamantanecarboxylic acids, 3,5-dimethyl-1-adamantanecarboxylic acid and the like.

The following examples are illustrative of the invention:

EXAMPLE 1

*1-adamantanecarboxylic acid chloride*

To 18 g. of 1-adamantanecarboxylic acid 50 ml. of thionyl chloride are added with cooling, and the mixture is heated under reflux for 30 minutes. The excess of thionyl chloride is removed in vacuo, the addition of 2 x 30 ml. of dry benzene (benzene dried over silica gel) and evaporation serving to remove the last traces. Anhydrous ether (30 ml.) is added and the solution evaporated leaving 19.2 g. (>92%) of 1-adamantanecarboxylic acid chloride as a brownish white solid;

$\lambda^{Nujol}_{max.}$ 5.61μ (C=O of acid chloride)

*1-adamantyl 1-aziridinyl ketone*

The acid chloride obtained above is dissolved in 125 ml. of dry ether and added dropwise with stirring (addition time 30 minutes) to a mixture of 4.3 g. of ethyleneimine and 10.1 g. of triethylamine, dissolved in 200 ml.

of dry ether, and cooled in an ice-salt mixture. After completing the addition, the ice-bath is removed, and the mixture stirred for another 30 minutes. The solid triethylamine hydrochloride precipitates out, is filtered off, washed with ether and dried; 13.1 g. (>95% conversion). The combined ethereal solution of the 1-adamantyl-1-aziridinyl ketone is made up to 400 ml. with dry ether;

$\lambda_{max.}^{Nujol}$ single broad peak at 5.9μ (amide C=O). The dry ethereal solution of the product is used as such for the next step.

1-adamantaldehyde

*Preparation of* $LiAlH_4$ *solution.*—To 9 g. of lithium aluminum hydride 200 ml. of dry ether are added, and the mixture heated gently under reflux for 8 hours. The suspension is then allowed to stand at room temperature for 2 days, and the clear supernatant liquid is drawn off. The clear solution is analyzed for the $LiAlH_4$ content by allowing an aliquot to evaporate at room temperature and then drying at 110° for 2 hours. Usually ca. 0.4 M solution results by this procedure.

*Reduction.*—The 1-adamantyl 1-aziridinyl ketone, obtained above, in dry ether (400 ml. of 0.1 M solution) is transferred to a 1 l. 3-necked flask fitted with an addition funnel, stirrer and protected by silica gel drying tubes. The flask is cooled in an ice-bath (external temperature, 0-3°), and to this cooled solution, 75 ml. of 0.33 M $LiAlH_4$ solution in dry ether is added dropwise with stirring (addition time 45 minutes). After addition, the mixture is stirred for 30 minutes at the temperature of the ice-bath, and for an additional 30 minutes after removing the cooling bath. The reaction mixture is then treated with 200 ml. of 10% sulfuric acid. The ethereal layer is separated, washed with 2 x 100 ml. of water, 100 ml. of saturated sodium bicarbonate solution and finally with 200 ml. of water. The ethereal layer is dried overnight over anhydrous $MgSO_4$. Evaporation of ether gives 14.2 g. (75%) of 1-adamantaldehyde as a thick pale yellow oil;

$\lambda_{max.}^{Nujol}$ no amide C=O at 5.9μ, broad aldehyde C=O at 5.78μ. Thiosemicarbazone melts at 193–194°.

*Analysis.*—Calc'd. for $C_{12}H_{19}N_3S$: C, 60.66; H, 8.07; S, 13.51. Found: C, 60.68; H, 8.16; S, 13.41.

Example 2

By following the procedure of Example 1 but substituting 3-methyl-1-adamantanecarboxylic acid for the 1-adamantanecarboxylic acid as starting material yields 3-methyl-1-adamantaldehyde.

Example 3

By following the procedure of Example 1 but substituting as starting material the 1-adamantanecarboxylic acid having the substituents indicated in the first column below, there are obtained the substituted 1-adamantaldehydes indicated in the second column. The same products are obtained when 2-butylaziridine or other aziridines are substituted for ethyleneimine.

| 3R, 5R¹-1-adamantanecarboxylic acid | | 3R, 5R¹-1-adamantaldehyde | |
|---|---|---|---|
| R | R¹ | R | R¹ |
| phenyl | H | phenyl | H |
| hydroxy | H | hydroxy | H |
| methoxy | H | methoxy | H |
| fluoro | H | fluoro | H |
| chloro | H | chloro | H |
| bromo | H | bromo | H |
| iodo | H | iodo | H |
| methyl | methyl | methyl | methyl |
| methyl | hydroxy | methyl | hydroxy |
| ethoxy | ethyl | ethoxy | ethyl |
| p-chlorophenyl | H | p-chlorophenyl | H |

What is claimed is:
1. A compound of the formula

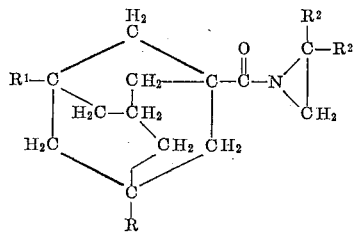

wherein R and R¹ each is hydrogen, halo, lower alkyl, phenyl, R-phenyl, hydroxy, or lower alkoxy and each R² is hydrogen or lower alkyl.

2. A compound as in claim 1 wherein R, R¹ and R² are each hydrogen.

3. A compound as in claim 1 wherein R is lower alkyl and R¹ and R² are each hydrogen.

4. A compound as in claim 3 wherein the lower alkyl group is methyl.

5. A compound as in claim 1 wherein R is halo and R¹ and R² are each hydrogen.

6. A compound as in claim 5 wherein the halogen is chlorine.

7. A compound as in claim 1 wherein R is phenyl and R¹ and R² are each hydrogen.

8. A compound as in claim 1 wherein R, R¹ and one R² are each hydrogen and the other R² is butyl.

No references cited.

ALEX MAZEL, *Primary Examiner.*

ALTON D. ROLLINS, *Examiner.*